(12) United States Patent
Saito

(10) Patent No.: US 11,893,211 B2
(45) Date of Patent: Feb. 6, 2024

(54) DISPLAY METHOD AND DISPLAY DEVICE

(71) Applicant: Yamaha Corporation, Shizuoka (JP)

(72) Inventor: Kosuke Saito, Milton Keynes (GB)

(73) Assignee: YAMAHA CORPORATION, Shizuoka (JP)

( * ) Notice: Subject to any disclaimer, the term of this patent is extended or adjusted under 35 U.S.C. 154(b) by 0 days.

(21) Appl. No.: 17/750,296

(22) Filed: May 20, 2022

(65) Prior Publication Data

US 2022/0374111 A1    Nov. 24, 2022

(30) Foreign Application Priority Data

May 24, 2021  (JP) ................................ 2021-086980

(51) Int. Cl.
*G06F 3/0482* (2013.01)
*G06F 3/16* (2006.01)

(52) U.S. Cl.
CPC ............ *G06F 3/0482* (2013.01); *G06F 3/165* (2013.01)

(58) Field of Classification Search
CPC .................. G06F 3/0482; G06F 3/165; G06F 2203/04803; G06F 3/04886; G06F 3/04847; H04H 60/04
See application file for complete search history.

(56) References Cited

U.S. PATENT DOCUMENTS

| | | | |
|---|---|---|---|
| 2009/0028359 A1* | 1/2009 | Terada | H04R 3/04 381/119 |
| 2009/0307633 A1* | 12/2009 | Haughay, Jr. | G06F 1/1626 715/841 |
| 2014/0293349 A1 | 10/2014 | Murai | |
| 2017/0288798 A1* | 10/2017 | Saito | H04S 3/008 |
| 2019/0222332 A1* | 7/2019 | Okabayashi | H04S 7/30 |
| 2020/0092642 A1* | 3/2020 | Saito | H04R 3/00 |

FOREIGN PATENT DOCUMENTS

| | | | |
|---|---|---|---|
| JP | 5086960 B2 | 11/2012 | |
| JP | 6115256 B2 | 4/2017 | |

* cited by examiner

*Primary Examiner* — Cao H Nguyen
(74) *Attorney, Agent, or Firm* — Global IP Counselors, LLP

(57) ABSTRACT

A display method includes displaying a list of a plurality of groups in a first area which is a first partial area of a display, and a name of a component belonging to at least one of the plurality of groups in a second area which is a second partial area of the display and is different from the first area. In the displaying, switching a display mode between a first display mode and a second display mode is performed in the second area. The first display mode is a mode in which all of the plurality of groups are displayed and a group, out of the plurality of groups, to which the component belongs is displayed in a display appearance different from that of a different group of the plurality of groups. The second display mode is a mode in which, out of the plurality of groups, only the group to which the component belongs is displayed.

14 Claims, 9 Drawing Sheets

|  | INPUT PORT | | | | | |
|---|---|---|---|---|---|---|
| Ch1 | 1 | 2 | 3 | 4 | 5 | 6 |
| Ch2 | 1 | 2 | 3 | 4 | 5 | 6 |
| Ch3 | 1 | 2 | 3 | 4 | 5 | 6 |
| Ch4 | 1 | 2 | 3 | 4 | 5 | 6 |
| Ch5 | 1 | 2 | 3 | 4 | 5 | 6 |
| Ch6 | 1 | 2 | 3 | 4 | 5 | 6 |

DISPLAY METHOD AND DISPLAY DEVICE

CROSS-REFERENCE TO RELATED APPLICATIONS

This application claims priority to Japanese Patent Application No. 2021-086980, filed on May 24, 2021. The entire disclosure of Japanese Patent Application No. 2021-086980 is hereby incorporated herein by reference.

BACKGROUND

Technical Field

The present invention relates to a data display method and a data display device.

Background Information

In the display method of Japanese Patent No. 6115256, three types of icon list screens, which are large, medium, and small icon list screens, are displayed as an icon list screen.

In the display method of Japanese Patent No. 5086960, content data are grouped and displayed hierarchically, such as by year, month, and day. That is, in the display method of Japanese Patent Number 5086960, content data are displayed on a yearly, monthly, or daily basis.

In the technologies of Japanese Patent No. 6115256 and Japanese Patent No. 5086960, it is not possible to ascertain to which group, out of all groups, certain data (components of a group) belong, and which group the group related to the data is.

In consideration of the foregoing, an object of one aspect of the present disclosure is to provide a display method with which it is possible to easily ascertain to which group, out of all groups, certain data (components of a group) belong, and which group the group related to the data is.

SUMMARY

A display method comprises displaying a list of a plurality of groups in a first area which is a first partial area of a display, and a name of a component belonging to at least one of the plurality of groups in a second area which is a second partial area of the display and is different from the first area. In the displaying, switching a display mode between a first display mode and a second display mode is performed in the second area. The first display mode is a mode in which all of the plurality of groups are displayed and a group, out of the plurality of groups, to which the component belongs is displayed in a display appearance different from that of a different group of the plurality of groups. The second display mode is a mode in which, out of the plurality of groups, only the group to which the component belongs is displayed.

BRIEF DESCRIPTION OF THE DRAWINGS

FIG. 3 is a diagram showing an input patch setting screen.

FIG. 6 is a diagram showing one example of a scene group management screen in a first display mode.

FIG. 7 is a diagram showing one example of a scene group management screen in a second display mode.

FIG. 9 is a diagram showing one example of the scene group management screen in the second display mode.

DETAILED DESCRIPTION OF THE EMBODIMENTS

Selected embodiments will now be explained in detail below, with reference to the drawings as appropriate. It will be apparent to those skilled from this disclosure that the following descriptions of the embodiments are provided for illustration only and not for the purpose of limiting the invention as defined by the appended claims and their equivalents.

Figure 1:
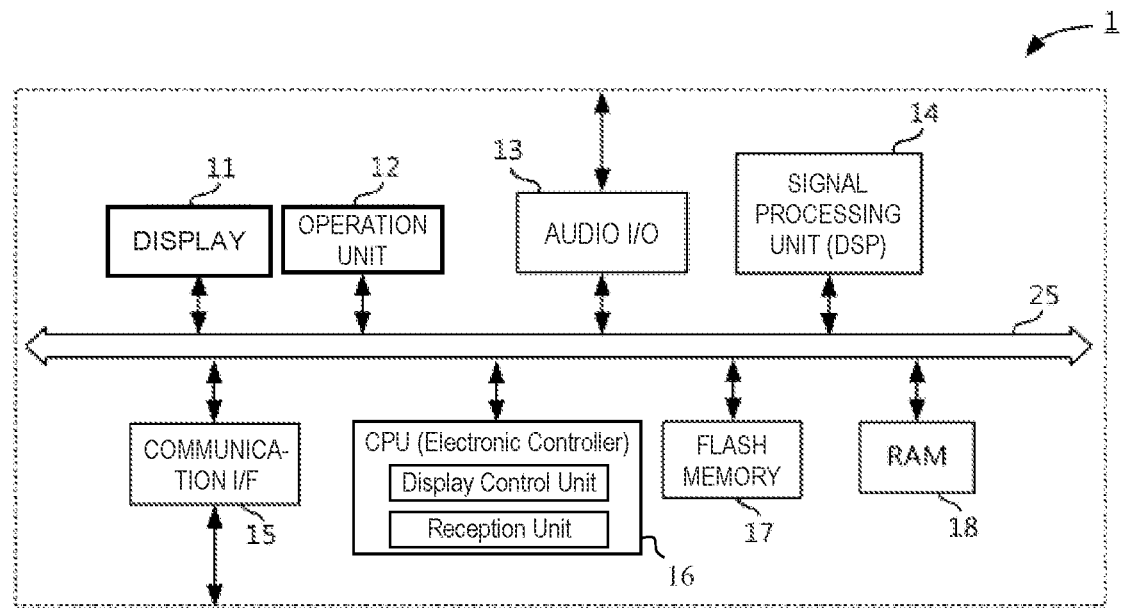
FIG. 1 is a block diagram showing a configuration of an audio mixer.

FIG. 1 is a block diagram showing a configuration of an audio mixer 1. The audio mixer 1 is one example of a display device of this disclosure. The audio mixer 1 has a display (display unit) 11, an operation unit 12, an audio I/O (Input/Output) 13, a signal processing unit 14, a communication interface (I/F) 15, a CPU 16, a flash memory 17, and a RAM (Random Access Memory) 18.

The display 11, the operation unit 12, the audio I/O (Input/Output) 13, the signal processing unit 14, the communication interface (I/F) 15, the CPU 16, the flash memory 17, and the RAM 18 are connected to each other via a bus 25.

The audio I/O 13 is an interface for receiving input of a sound signal to be processed by the signal processing unit 14. The audio I/O 13 is provided with an input port such as an analog input port or a digital input port, that receives input of the sound signal. Further, the audio I/O 13 is an interface for outputting a sound signal that has been processed by the signal processing unit 14. The audio I/O 13 is provided with an output port such as an analog output port or a digital output port, that outputs the sound signal.

The communication I/F 15 is an interface for communicating with other devices. For example, an external PC is connected to the communication I/F 15. Alternatively, the communication I/F 15 sends and receives a sound signal that conforms to a standard, such as Dante (registered trademark), via a network.

The CPU 16 is an electronic controller (control unit) that controls the operation of the audio mixer 1. The electronic controller can include one or a plurality of processors and is configured from one or more types of processors, such as a CPU (Central Processing Unit), a GPU (Graphics Processing Unit), a DSP (Digital Signal Processor), an FPGA (Field Programmable Gate Array), an ASIC (Application Specific Integrated Circuit), and the like. Here, the term "electronic controller" as used herein refers to hardware, and does not include a human. The CPU 16 reads a prescribed program stored in the flash memory 19 as a storage unit (computer memory) into the RAM 20 to perform various operations. The CPU 16 functions as a display control unit of the display 11 by the program.

The display 11 displays various information in accordance with the control of the CPU 16. The display 11 is configured from, for example, an LCD (Liquid Crystal Display) or a light-emitting diode (LED).

The operation unit 12 is a user operable input and receives an operation of the audio mixer 1 from a user. The operation unit 12 includes various keys, buttons, rotary encoders, sliders, and the like. Further, the operation unit 12 can be a touch panel overlaid on an LCD serving as the display 11.

The signal processing unit 14 includes a DSP (Digital Signal Processor) for performing various signal processes, such as mixing or effects processing. The signal processing unit 14 performs signal processing, such as mixing or equalizing, of a sound signal supplied from the audio I/O 13 or the communication I/F 15. The signal processing unit 14 outputs a digital audio signal that has been subjected to signal processing via the audio I/O 13 or the communication I/F 15.

Figure 2:
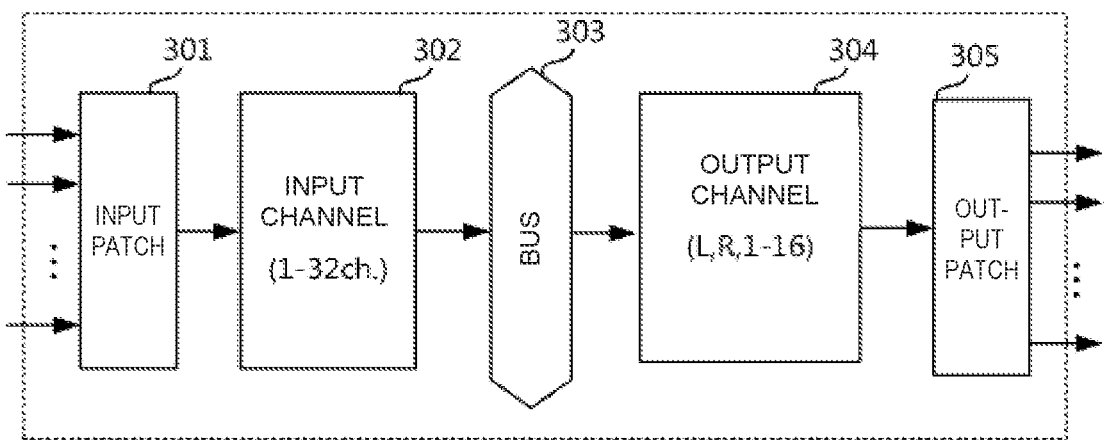
FIG. 2 is a function block diagram of signal processing.

FIG. 2 is a function block diagram of the signal processing. As shown in FIG. 2, the signal processing is performed by an input patch 301, an input channel 302, a bus 303, an output channel 304, and an output patch 305.

The input patch 301 inputs audio signals from a plurality of input ports (for example, analog input ports or digital input ports) of the audio I/O 13, and assigs one of the plurality of ports to at least one of a plurality of input channels (for example, 32 ch). FIG. 3 is a diagram showing an example of a setting screen of the input patch 301. The setting screen of the input patch 301 is displayed on the display 11. The setting screen of the input patch 301 displays the channel names and port numbers in matrix format. A touch panel is overlaid on the display 11. The user selects each port number in the matrix, thereby specifying the channel to be assigned to each port. In this way, the audio signal is supplied to each channel of the input channel 302.

Figure 4:
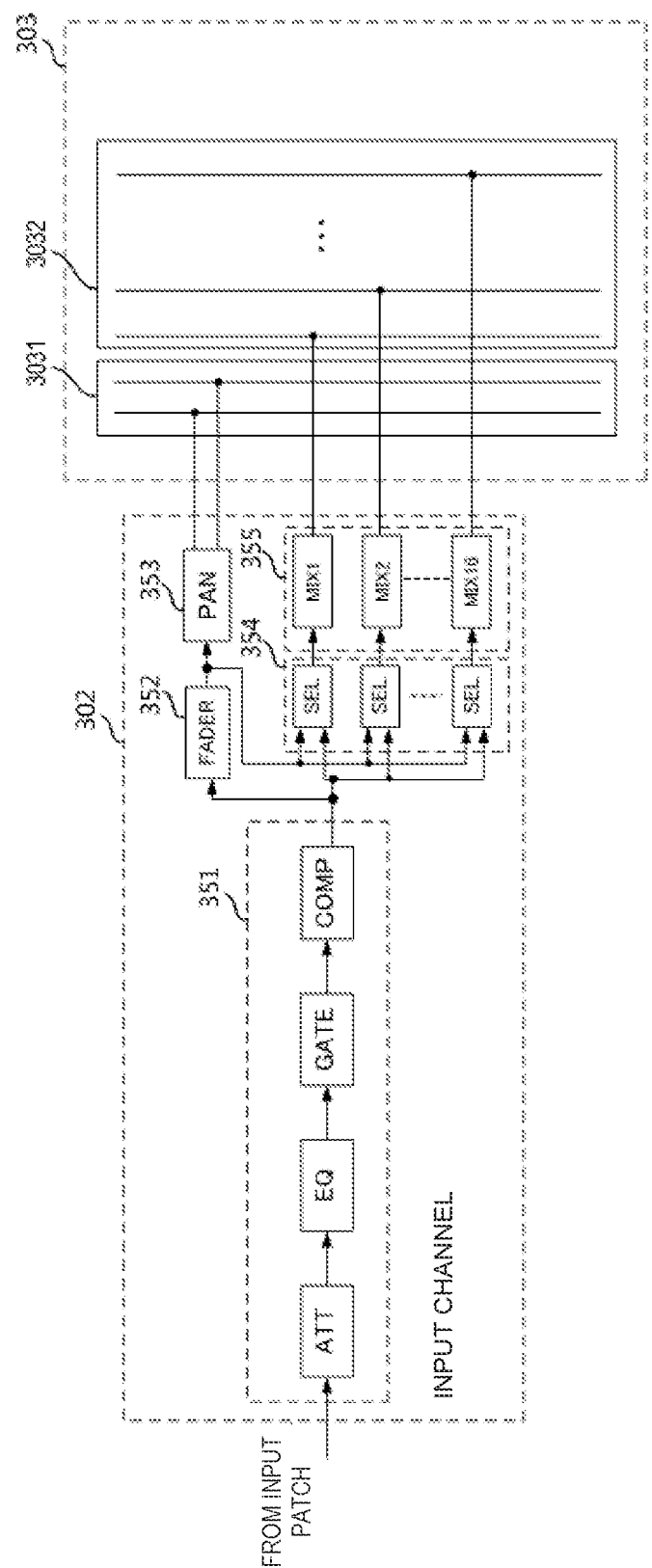
FIG. 4 is a diagram showing a processing configuration of a given input channel 1.

FIG. 4 is a block diagram showing the functional configuration of the signal processing of a given input channel i. In a signal processing block 351, each input channel of the input channel 302 performs signal processing of an attenuator (ATT), an equalizer (EQ), a gate (GATE), a compressor (COMP), or the like on the audio signal supplied from the input patch 301.

After signal processing, the audio signal is subjected to level adjustment in a fader section (FADER) 352, and then sent to a downstage bus 303 via a pan section (PAN) 353. The pan section 353 adjusts the balance of the signal supplied to a stereo bus (a 2-channel bus serving as a master output) 3031 of the bus 303.

Further, the audio signal on which the signal processing has been performed is subjected to level adjustment in a feed section (MIX1-MIX16) 355 via a selector (SEL) 354, and then sent to the downstage bus 303. The SEL 354 can input, to the downstage feed section 355, by the user's selecting operation, either a signal output from the signal processing block 351 or a signal after being subjected to level adjustment by the fader section 352. At the feed section 355, whether or not a signal is suppled to each MIX bus 3032 (MIX1-MIX16) of the bus 303 is switched by a user. Further, the feed section 355 adjusts the level of the signal supplied to each MIX bus 3032 in accordance with each feed amount set by the user.

The output channel 304 has, for example, 16 channels. Each of the channels of the output channel 304 applies various signal processing to the audio signal that is input, in the same manner as the input channel. Each channel of the output channel 304 sends the audio signal after signal processing to the output patch 305. The output patch 305 assigns each channel to one of a plurality of analog output ports or digital output ports. The audio signal after being subjected to signal processing is thus supplied to the audio I/O 13.

The signal processing described above is controlled based on the set values of various parameters. The CPU 16 stores the currently set values (current data) of the various parameters in the RAM 20. The CPU 16 updates the current data when the user operates the operation unit 12.

Figure 5:
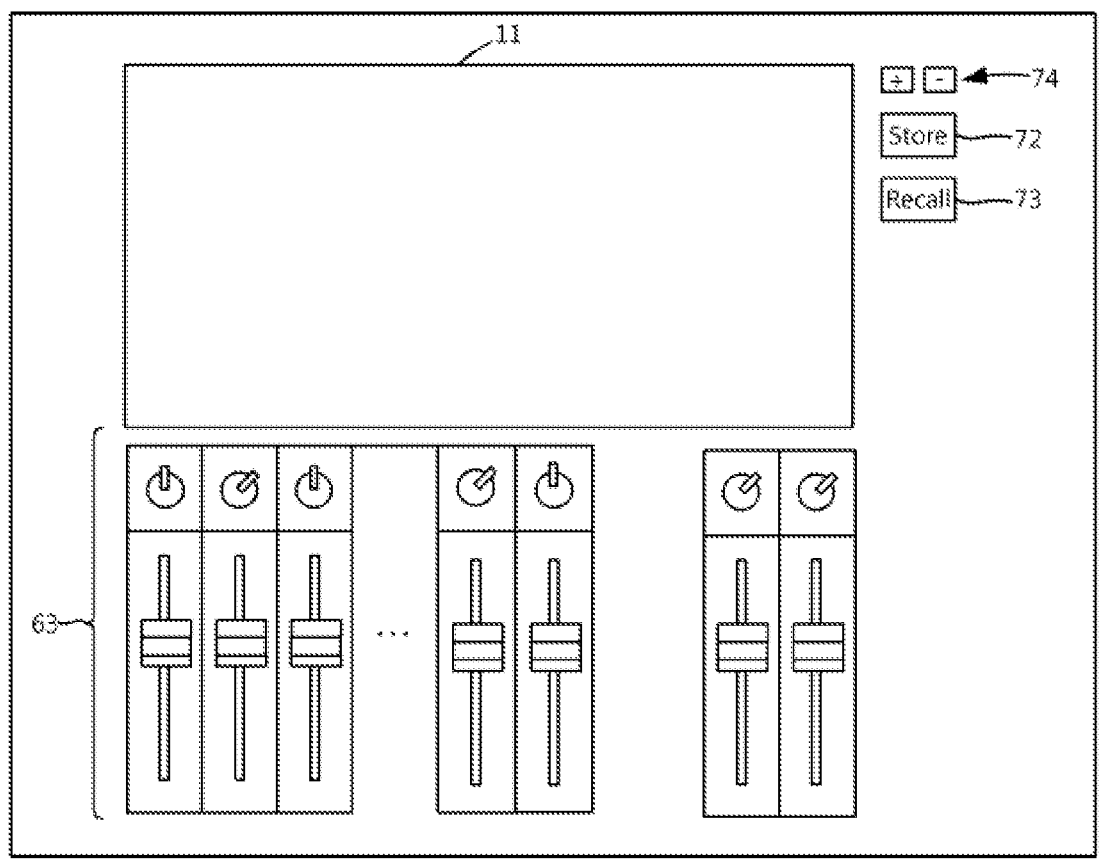
FIG. 5 is a diagram showing a configuration of an operation panel of an audio mixer 1.

Next, FIG. 5 is a diagram showing a configuration of an operation panel of the audio mixer 1. As shown in FIG. 5, the display 11, a channel strip 63, a store button 72, a recall button 73, increase/decrease buttons 74, and the like, are provided on the operation panel of the audio mixer 1. The display 11 is a display on which a touch panel has been overlaid, which is one aspect of the operation unit 12, and displays a GUI (Graphical User Interface) screen for receiving user operations. The GUI of the display 11, the channel strip 63, the store button 72, the recall button 73, and the increase/decrease buttons 74 correspond to the operation unit 12.

The channel strip 63 is an area in which a plurality of operators for receiving an operation with respect to one channel are arranged vertically. In FIG. 5, only one fader and one knob are displayed for each channel as the operators, but in practice, numerous knobs, switches, etc., are provided. A plurality (for example, 16) of faders and knobs arranged on the left side of the channel strip 63 correspond to the input channel. The two faders and knobs arranged on the right side are operators that correspond to the master output (2-channel bus).

The store button 72 is a button for an instruction to store scene data. The user can thus operate the store button 72 to record (store) the current data in the flash memory 19 as one piece of scene data. A plurality of scene data are stored in the flash memory 19. Further, the user can operate the increase/decrease buttons 74 to select, from among the plurality of scene data, the scene data to be saved or recalled. The user can operate the recall button 73 to recall the necessary scene data in order to recall the set values of the various parameters. These buttons can be configured by a GUI using the touch panel overlaid on the display 11.

Further, the audio mixer 1 of the present embodiment can group and manage the plurality of scene data. For example, the user designates scene data of the same song, the same singer, the same performer, or the like, as the same scene group. For example, the user edits and stores certain scene data and carries out an operation to copy the stored scene data as certain scene data. In this case, the user can collectively copy certain arbitrary scene data as a grouped plurality of scene data. Further, the user can collectively copy a certain arbitrary parameter as a grouped plurality of scene data.

Figure 6:
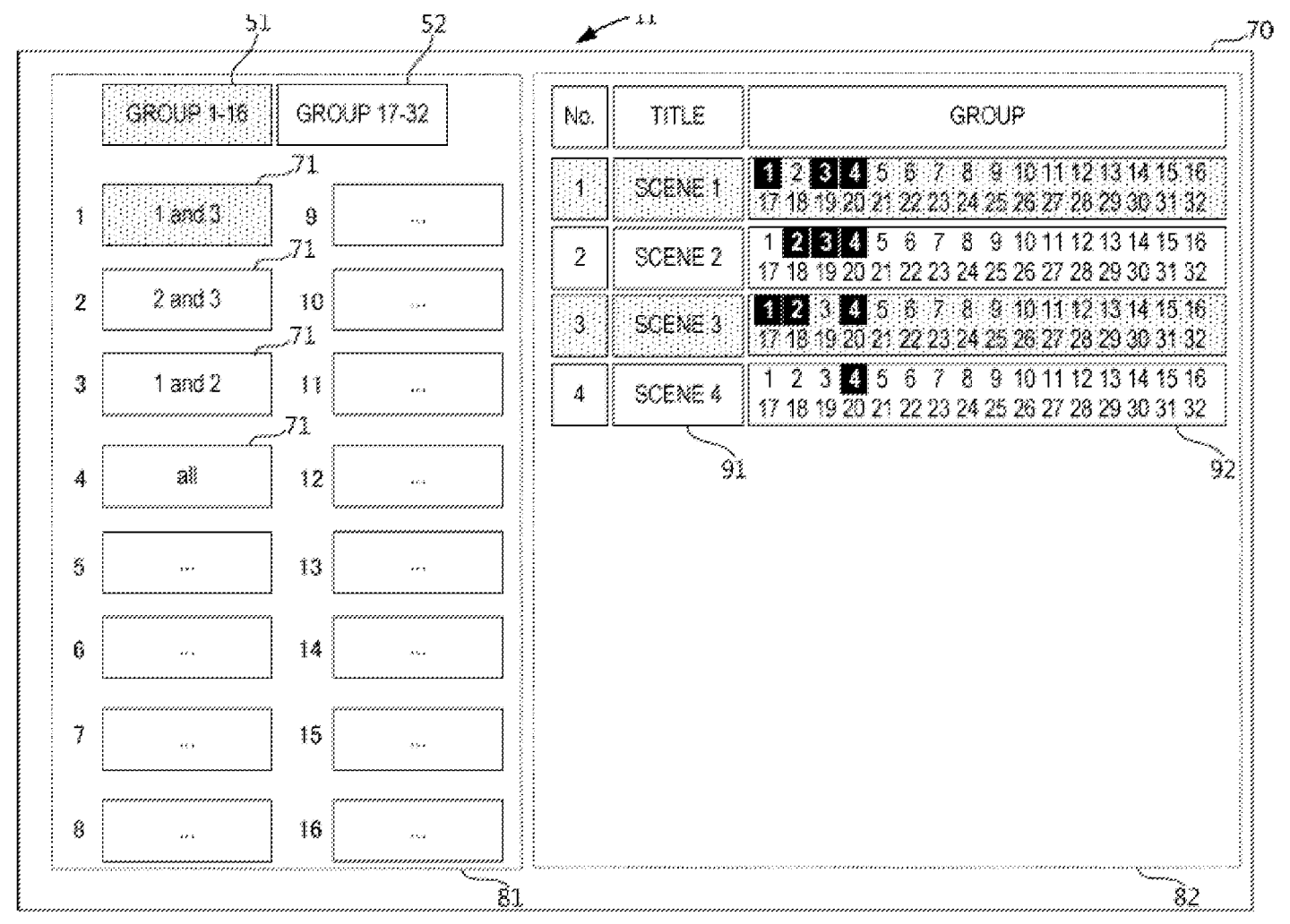

FIG. 6 is a diagram showing one example of a scene group management screen in a first display mode, which is displayed on the display 11. The scene group management screen 70 has a first area 81 and a second area 82. The first display mode is a mode in which, in the second area 82, all of the plurality of groups are displayed and one or more groups, out of the plurality of groups, to which the scene data belong are displayed in a display appearance different from that of at one or more different groups of the plurality of groups. The first area 81 displays a list of a plurality of scene groups. The first area 81 includes a group selection tab 51, a group selection tab 52, and a plurality of group selection icons 71. When the user selects the group selection tab 51, a list of scene groups 1-16 is displayed in the first area. When the user selects the group selection tab 52, a list of scene groups 17-32 is displayed in the first area. The number of scene groups is not limited to the number shown in the present embodiment.

In the example of FIG. 6, since the user has selected the group selection tab 51, the list of scene groups 1-16 is displayed in the first area. The user selects any scene group from the group selection icons 71. In the example of FIG. 6, the user has selected scene group 1. The scene group 1 includes scene data 1 and scene data 3.

The second area 82 has a title display portion 91 that displays at least one a name (TITLE) of the scene data corresponding to a component belonging to the scene group, and a group display portion 92 that displays all of the scene groups. In FIG. 6, four names of the scene data, i.e., scenes 1-4 are displayed in the title display portion 91. The group display portion 92 further displays the scene group(s) to which each piece of the scene data belongs in a display appearance that is different from that of the other scene groups. In the sample of FIG. 6, the group display portion 92 inverts color of the scene groups to which the scene data belong. However, the display appearance can be any appearance, such as changing of color or hatching.

In the example of FIG. 6, the user has selected scene group 1 in the first area 81. The scene group 1 includes scene data 1 and scene data 3. Therefore, in the second area 82, the scene data 1 and the scene data 3 appear emphasized. Further, the scene data 1 belong to the scene group 1, the scene group 3, and the scene group 4. As a result, in the group display portion 92 for the scene data 1, the scene group 1, the scene group 3, and the scene group 4 are color inverted. The scene data 2 belong to the scene group 2, the scene group 3, and the scene group 4. As a result, in the group display portion 92 for the scene data 2, the scene group 2, the scene group 3, and the scene group 4 are color inverted. The scene data 3 belong to the scene group 1, the scene group 2, and the scene group 4. As a result, in the group display portion 92 for the scene data 3, the scene group 1, the scene group 2, and the scene group 4 are color inverted. The scene data 4 belong to the scene group 4. As a result, the scene group 4 is color inverted in the group display portion 92 for the scene data 4.

In the first display mode, the user can easily ascertain to which scene group, out of all the scene groups, each piece of the scene data belongs.

Figure 7:
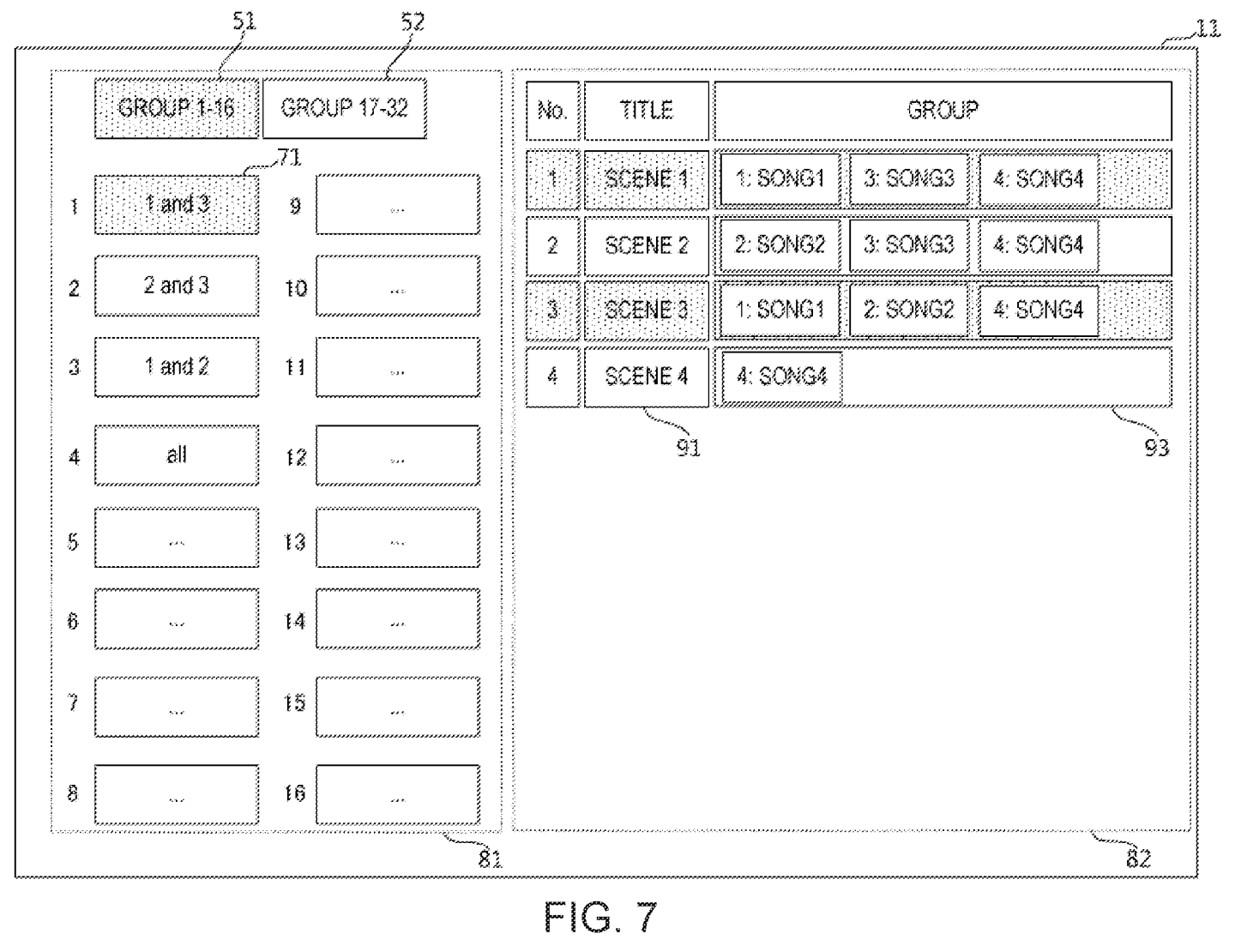

FIG. 7 is a diagram showing one example of a scene group management screen in a second display mode. The second display mode is a mode in which, out of the plurality of groups, only one or more groups to which the scene data belong are displayed in the second area 82. The configurations that are the same as those in FIG. 6 have been assigned to the same reference numerals, and their descriptions have been omitted.

In the second display mode, the second area 82 has a belonging group display portion 93 instead of the group display portion 92 that displays all the scene groups. The belonging group display portion 93 displays, out of the plurality of scene groups, only the scene group(s) to which each piece of the scene data belongs.

In the example of FIG. 7, the scene data 1 belong to the scene group 1, the scene group 3, and the scene group 4. As a result, in the belonging group display portion 93 for the scene data 1, only the scene group 1, the scene group 3, and the scene group 4 are displayed. In the belonging group display portion 93 for the scene data 2, only the scene group 2, the scene group 3, and the scene group 4 are displayed. In the belonging group display portion 93 for the scene data 3, only the scene group 1, the scene group 2, and the scene group 4 are displayed. In the belonging group display portion 93 for the scene data 4, only the scene group 4 is displayed.

In the second display mode, because only one or more scene groups that each piece of the scene data belongs to are displayed, it is possible to display more detailed information than in the first display mode in which all of the scene groups are displayed. For example, in FIG. 7, the belonging group display portion 93 displays a name of the scene group. In the belonging group display portion 93 for the scene data 1, only the name (SONG 1) of the scene group 1, the name (SONG 3) of the scene group 3, and the name (SONG 4) of the scene group 4 are displayed.

In the second display mode, the user can easily and specifically grasp which scene group(s) the scene group(s) that corresponds to each piece of the scene data is.

In this disclosure, when the CPU 16 displays the list of the plurality of scene groups in the first area 81, and the names of the scene data belonging to at least one of the plurality of groups in the second area 82 in the display 11, the CPU 16 switches a display mode between the first display mode and the second display mode in the second area 82.

Figure 8:
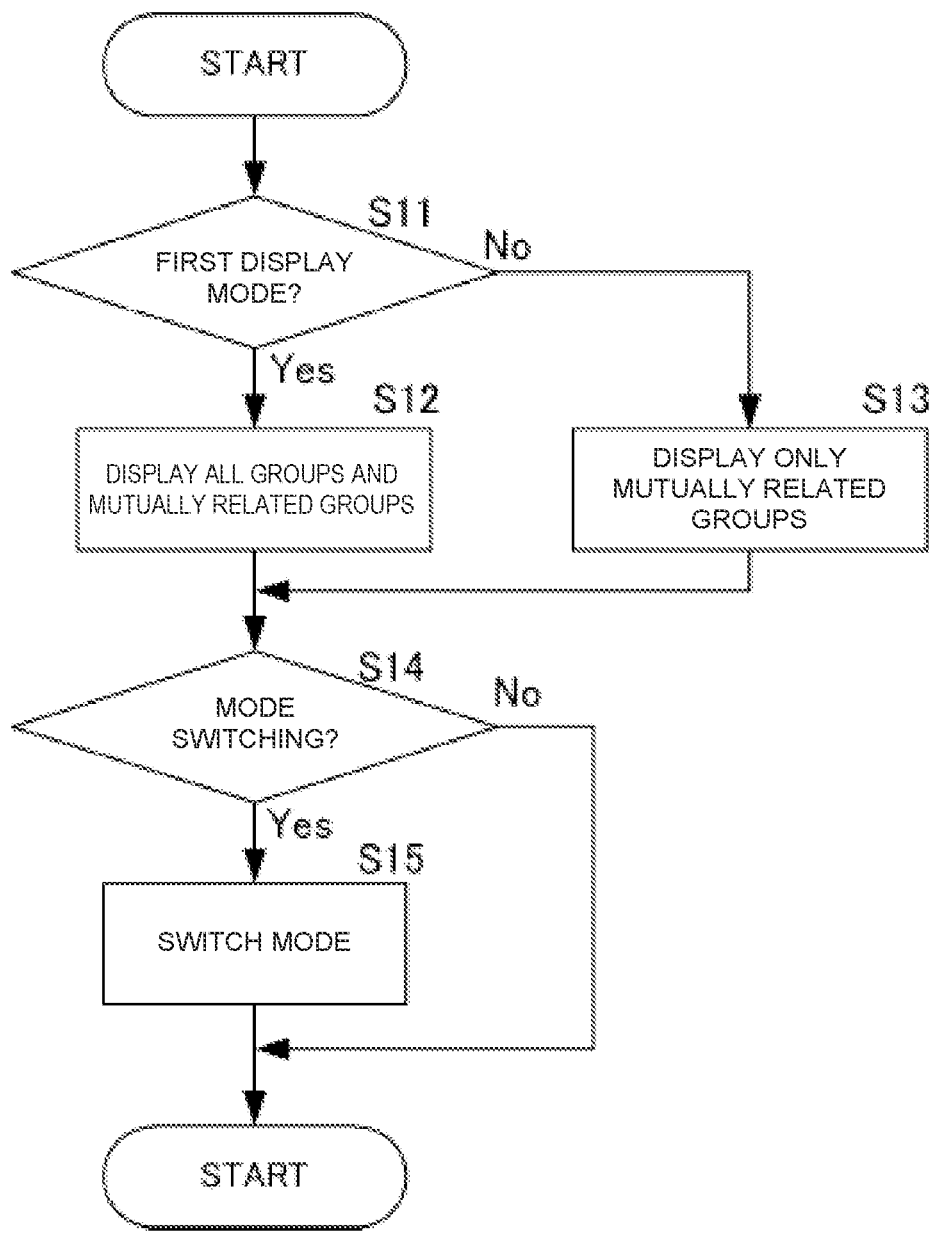
FIG. 8 is a flowchart showing a display control operation of a CPU 16.

FIG. 8 is a flowchart showing a display control operation of the CPU 16. The CPU 16 determines whether the display mode is the first display mode or the second display mode (S11). If it is determined to be the first display mode (S11: Yes), the CPU 16 displays all of the scene groups, and displays the scene group(s) to which each piece of scene data belongs in a display appearance that is different from that of the other scene groups (S12). On the other hand, if it is determined to be the second display mode (S11: No), the CPU 16 displays, out of the plurality of scene groups, only the scene group(s) to which each piece of the scene data belongs (S13).

The CPU 16 determines whether mode switching has been received (S14). The mode switching is received by a touch operation with respect to the title display portion 91 of the second area 82, for example. However, the manner in which mode switching is received is not limited to this example. For example, the audio mixer 1 can comprise a mode switching button in the configuration of the operation panel shown in FIG. 5 and receive the mode switching via the mode switching button.

When it is determined that the mode switching has been received as a result of receiving a touch operation with respect to the title display portion 91, or the like (S14: Yes), the CPU 16 switches the display mode (S15). If the current display mode is the first display mode, the CPU 16 switches to the second display mode. If the current display mode is the second display mode, the CPU 16 switches to the first display mode.

As described above, by the audio mixer 1 according to the present embodiment, in the first display mode, the user can easily ascertain to which scene groups, out of all the scene groups, each piece of the scene data belongs. Further, in the second display mode, the user can easily ascertain which scene group a scene group related to each piece of the scene data is. As a result of the audio mixer 1 switching between the first display mode and the second display mode, the user can easily ascertain to which scene group, out of all the scene groups, each piece of the scene data belongs, and for each piece of the scene data, easily ascertain which scene group a scene group related to each piece of the scene data is, even in a small display area.

Figure 9:
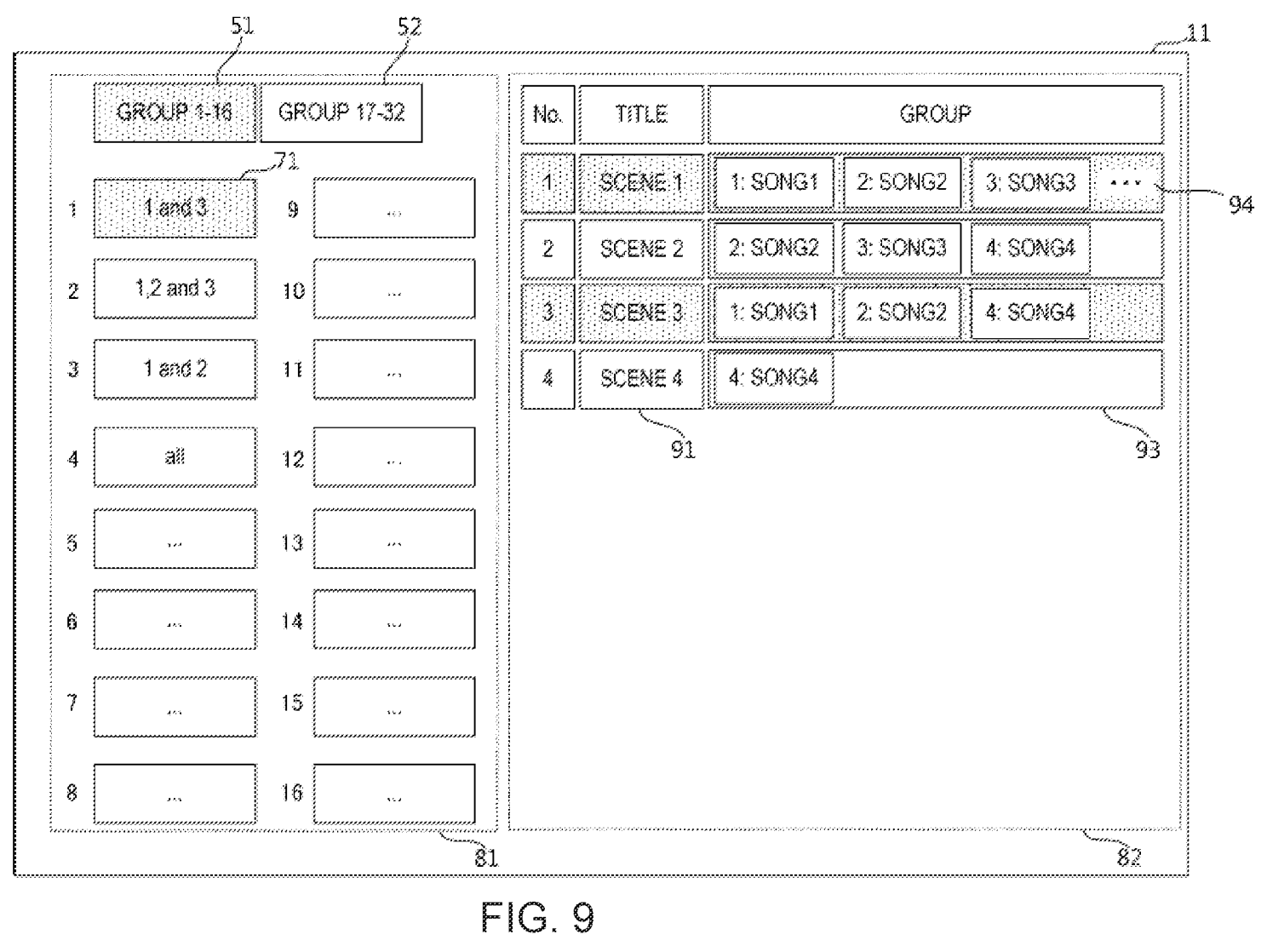

In the second display mode, if the number of scene groups to which each piece of the scene data belongs is greater than a prescribed number, the displaying of the scene group that exceeds the prescribed number can be omitted, and an indication that such omission is made can be displayed. For example, as in FIG. 9, if the groups to which the scene data 1 belong are the scene group 1, the scene group 2, the scene group 3, and the scene group 4, the CPU 16 omits the display of the scene group 4, and displays an omitted display icon 94. In this example, the prescribed number is three so that three scene groups are displayed in the belonging group display portion 93, but the prescribed number can be one, two, or four or more.

In this manner, the audio mixer 1 can omit the display of some scene groups in order to display a large amount of information even if the number of scene groups to which each piece of scene data belongs increases.

The CPU 16 further functions as a reception unit that receives a change operation of the scene group to which each piece of the scene data belongs in response to, for example, a touch operation with respect to the operation unit 12. Operation to change the scene group to which each piece of the scene data belongs is preferably carried out in a separate setting screen as the operation unit 12. Accordingly, if the CPU 16 receives a touch operation with respect to the second area 82, the CPU 16 preferably does not accept a change of the scene group to which each piece of the scene data belongs. Further, because the operation to change the scene group to which each piece of the scene data belongs can be carried out on a separate setting screen, even if a touch operation with respect to the second area 82 is received, the CPU 16 does not change the display contents of the first area 81. As a result, the user does not confuse the setting screen of the input patch 301 shown in FIG. 3 with the scene group management screen.

In the example described above, the first display mode and the second display mode are switched for all scene data. However, the switching between the first display mode and the second display mode can be performed in accordance with each piece of the scene data.

Figure 10:
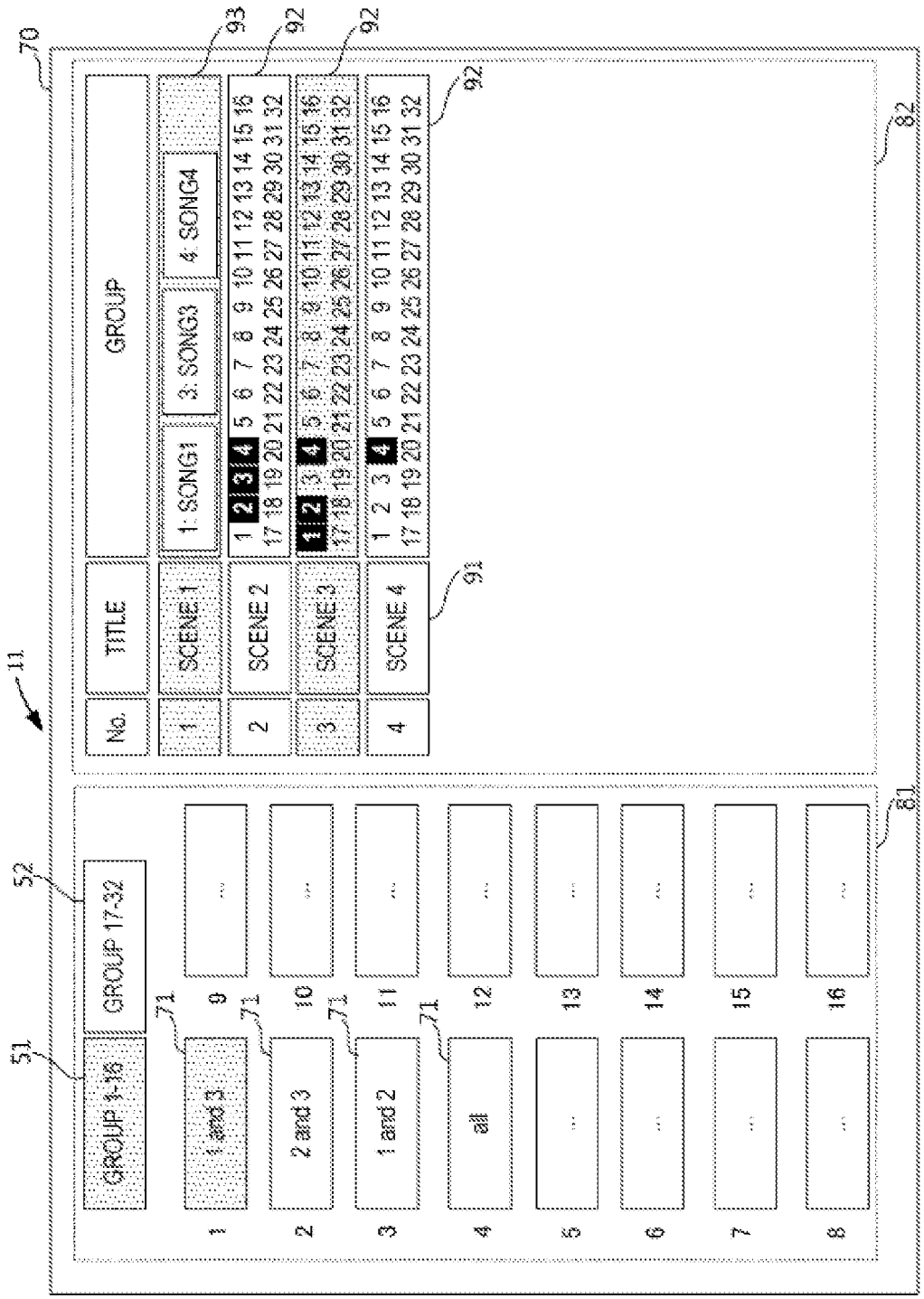
FIG. 10 is a diagram showing one example of a scene group management screen when switching a display mode between a first display mode and a second display mode for each piece of scene data.

For example, as shown in FIG. 10, the CPU 16 can display only the scene data 1 in the second display mode and display the other scene data 2-4 in the first display mode. In this case, the CPU 16 receives a touch operation with respect to the title display portion 91 of each piece of the scene data, and switches the display mode for each piece of the scene data.

By this disclosure, it is possible to easily ascertain to which group, among all groups, certain data (components in a group) belong, and which group a group related to the certain data is.

The description of the present embodiment is to be regarded in all respects in the sense of an example, and should not be considered restrictive. The scope of the present invention is indicated by the claims section, and not by the embodiment described above. Furthermore, the scope of the present invention is intended to include the meaning that is equivalent that of the claims, as well as all modifications within the scope thereof.

For example, in the present embodiment, the scene data are illustrated as one example of components, and the scene groups are shown as plurality of groups. However, the components of this disclosure are not limited to the scene data, and the groups are not limited to the scene groups. For example, the components can be the input channels of the input channel 302. Further, the groups can be MIX buses. In this case, in the first display mode, the CPU 16 displays a list (for example, numbers between 1-16) of all the MIX buses, and displays the MIX buses (the numbers of the MIX buses) for which the transmission of sound signals from each input channel is set to ON in a display appearance that is different than that of the numbers of the other MIX buses. Alternatively, the CPU 16 displays the number of the MIX buses for which the gain value of the volume of the input channel is set to be larger than $-\infty$ in a display appearance that is different from that of the numbers of the other MIX buses. In the second display mode, the CPU 16 displays only the numbers of the MIX buses for which the transmission of the input channel is set to ON, or for which the gain value is set to be larger than $-\infty$. In the second display mode, the CPU 16 can display the names of the MIX buses for which the transmission is set to ON, or for which the gain value is set to be larger than $-\infty$.

Or, conversely, the components can be MIX buses, and the groups to which each of the components belongs can be the input channels of the input channel 302. In this case, the CPU 16 can display the names of the MIX buses in the tide display portion 91, the numbers of the input channels in the group display portion 92 in the first display mode, and the names of the input channels in the belonging group display portion 93 in the second display mode.

Further, the components can be input channels and the groups can be auto mixers. Alternatively, the components can be input channels and the groups can be channel groups. Further, the components can be faders and the groups can be DCA (Digital Controlled Amplifier) faders.

Alternatively, the components can be channel groups, and the groups to which each of the components belongs can be input channels. In this case, the CPU 16 can display the names of the channel groups in the title display portion 91, the numbers of the input channels in the group display portion 92 in the first display mode, and the names of the input channels in the belonging group display portion 93 in the second display mode.

Further, in the present embodiment, the components are constituent elements related to audio processing, but the components may be constituent elements of other types of processing besides audio processing. For example, the components may be photograph data and the groups may be specific people. In this case, in the first display mode, a CPU of an information processing device displays a list (for example, the initials) of all persons and displays the person to which each photograph belongs in a display appearance that is different from that of the other persons. In the second display mode, the CPU displays only the person to which each photograph belongs. In the second display mode, the CPU may display details related to each person, such as their full name. Further, the components may be parameters of equipment in a factory, and the groups may be buildings. In this case, in the first display mode, the CPU displays all of the buildings and the building (for example, its number) to which each piece of equipment belongs in a display appearance that is different from that of the other buildings. In the second display mode, the CPU displays only the building to which each equipment belongs. In the second display mode, the CPU may display details, such as the names of buildings.

What is claimed is:

1. A display method comprising:
    displaying
        a list of a plurality of groups in a first area which is a first partial area of a display, and
        a name of a component belonging to at least one of the plurality of groups in a second area which is a second partial area of the display and is different from the first area,
    in the displaying, switching a display mode between a first display mode and a second display mode being performed in the second area, the first display mode being a mode in which all of the plurality of groups are displayed and a group, out of the plurality of groups, to which the component belongs is displayed in a display appearance different from that of a different group of the plurality of groups, and the second display mode being a mode in which, out of the plurality of groups, only the group to which the component belongs is displayed, and in the second display mode, in response to a number of groups to which the component belongs being greater than a prescribed number, omitting of displaying of a group that exceeds the prescribed number being performed, and displaying of an indication of the omitting being performed.

2. The display method according to claim 1, wherein in the displaying, a change of the group to which the component belongs is not accepted via an operation with respect to the second area.

3. The display method according to claim 1, wherein the displaying in the first area is not changed at a time of an operation with respect to the second area.

4. The display method according to claim 1, wherein in the displaying, a plurality of names of components including the name of the component are displayed, and the plurality of groups are displayed for each of the components, and the switching of the display mode between the first display mode and the second display mode is performed for all of the components.

5. The display method according to claim 1, wherein in the displaying, a plurality of names of components including the name of the component are displayed, and the plurality of groups are displayed for each of the components, and the switching of the display mode between the first display mode and the second display mode is performed for each of the components.

6. The display method according to claim 1, wherein the component is related to audio processing.

7. The display method according to claim 1, wherein the component is a scene, and the group is a scene group.

8. A display device comprising:

a display; and an electronic controller including at least one processor, the electronic controller being configured to execute a plurality of units that include a display control unit configured to display
 a list of a plurality of groups in a first area which is a first partial area of a display and
 a name of a component belonging to at least one of the plurality of groups in a second area which is a second partial area of the display and is different from the first area, the display control unit being configured to switch a display mode between a first display mode and a second display mode in the second area, the first display mode being a mode in which all of the plurality of groups are displayed and a group, out of the plurality of groups, to which the component belongs is displayed in a display appearance different from that of a different group of the plurality of groups, and the second display mode being a mode in which, out of the plurality of groups, only the group to which the component belongs is displayed, and in the second display mode, in response to a number of groups to which the component belongs is greater than a prescribed number, the display control unit being configured to perform omission of displaying of a group that exceeds the prescribed number, and display an indication of the omission.

9. The display device according to claim 8, wherein the display control unit is configured not to accept a change of the group to which the component belongs via an operation with respect to the second area.

10. The display device according to claim 8, wherein the display control unit is configured not to change displaying of the first area at a time of an operation with respect to the second area.

11. The display device according to claim 8, wherein the display control unit is configured to display a plurality of names of components including the name of the component, and display the plurality of groups for each of the components, and the display control unit is configured to switch the display mode between the first display mode and the second display mode for all of the components.

12. The display device according to claim 8, wherein the display control unit is configured to display a plurality of names of components including the name of the component, and display the plurality of groups for each of the components, and the display control unit is configured to switch the display mode between the first display mode and the second display mode for each of the components.

13. The display device according to claim 8, wherein the component is an element related to audio processing.

14. The display device according to claim 8, wherein the component is a scene, and the group is a scene group.

* * * * *